United States Patent
Yamagishi et al.

(10) Patent No.: US 8,411,327 B2
(45) Date of Patent: Apr. 2, 2013

(54) DATA PROCESSING DEVICE, IMAGE FORMING DEVICE, SYSTEM, AND A COMPUTER-READABLE RECORDING MEDIUM FOR DETERMINING WHETHER OR NOT IMAGE IS PROPERLY FORMED ON RECORDING MEDIUM

(75) Inventors: Shigekazu Yamagishi, Kanagawa (JP); Hirofumi Ishii, Kanagawa (JP); Tohru Yamano, Kanagawa (JP); Yosuke Takebe, Kanagawa (JP); Hiroshi Yoshihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1131 days.

(21) Appl. No.: 12/053,380

(22) Filed: Mar. 21, 2008

(65) Prior Publication Data

US 2009/0080034 A1    Mar. 26, 2009

(30) Foreign Application Priority Data

Sep. 26, 2007    (JP) .................. 2007-249475

(51) Int. Cl.
*H04N 1/40*    (2006.01)
*G06K 9/40*    (2006.01)
*G03G 15/00*    (2006.01)

(52) U.S. Cl. .......... 358/3.24; 358/1.9; 358/2.1; 358/3.1; 358/501; 358/505; 358/521; 358/464; 358/465; 358/466; 382/108; 382/169; 382/255; 382/274; 399/49; 399/371

(58) Field of Classification Search .................. 358/465, 358/1.9, 2.1, 1.1, 1.2, 3.02, 3.1, 3.12, 3.22, 358/3.31, 501, 504, 405, 521.523, 466, 296; 382/169, 255, 258, 282, 286, 317, 318

See application file for complete search history.

(56) References Cited

U.S. PATENT DOCUMENTS 3,868,510 A * 2/1975 Murata et al. ................. 250/366
5,289,204 A * 2/1994 Saotome et al. .............. 347/225

(Continued)

FOREIGN PATENT DOCUMENTS

| CN | 1670629 A | 9/2005 |
| JP | 09-240120 A | 9/1997 |

(Continued)

OTHER PUBLICATIONS

Japanese Office Action dated Feb. 9, 2010 for Japanese Patent Application 2007-249475.
Chinese Office Action dated Apr. 20, 2011 for Chinese Patent Application 200810092508.3.

*Primary Examiner* — Steven Kau
(74) *Attorney, Agent, or Firm* — Sughrue Mion, PLLC

(57) ABSTRACT

There is provided a data processing device that includes an obtaining unit that obtains a first image data set, a second image data set generated by reading an image formed using the first image data set, and a property data set indicating the properties of a recording medium on which the image is to be reproduced. The data processing device also includes a specifying unit that determines a threshold for a density difference between the first image data set and the second image data set, wherein the threshold depends on the property data set. The specifying unit also determines an error area where the density difference between images expressed by the first and second image data sets is equal to or greater than the threshold.

19 Claims, 7 Drawing Sheets

U.S. PATENT DOCUMENTS

| | | | |
|---|---|---|---|
| 5,636,331 A * | 6/1997 | Klinefelter et al. | 358/1.9 |
| 6,360,063 B1 * | 3/2002 | Haneda et al. | 399/18 |
| 6,575,095 B1 * | 6/2003 | Mahy et al. | 101/485 |
| 6,968,076 B1 * | 11/2005 | OuYang et al. | 382/112 |
| 7,149,441 B2 * | 12/2006 | Akita et al. | 399/45 |
| 7,369,785 B2 * | 5/2008 | Imayoshi et al. | 399/45 |
| 7,463,388 B2 * | 12/2008 | Tomiyasu et al. | 358/3.24 |
| 2005/0116980 A1 | 6/2005 | Nakahanada et al. | |
| 2005/0207767 A1 | 9/2005 | Imayoshi et al. | |
| 2008/0130942 A1 * | 6/2008 | Kitani | 382/100 |

FOREIGN PATENT DOCUMENTS

| | | | |
|---|---|---|---|
| JP | 09-278025 A | | 10/1997 |
| JP | 10-155088 | * | 9/1998 |
| JP | 11-034449 A | | 2/1999 |
| JP | 2005-153469 A | | 6/2005 |
| JP | 2007-158782 A | | 6/2007 |

* cited by examiner

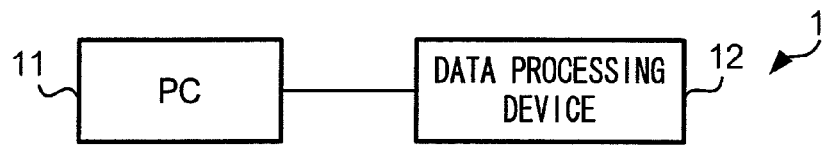
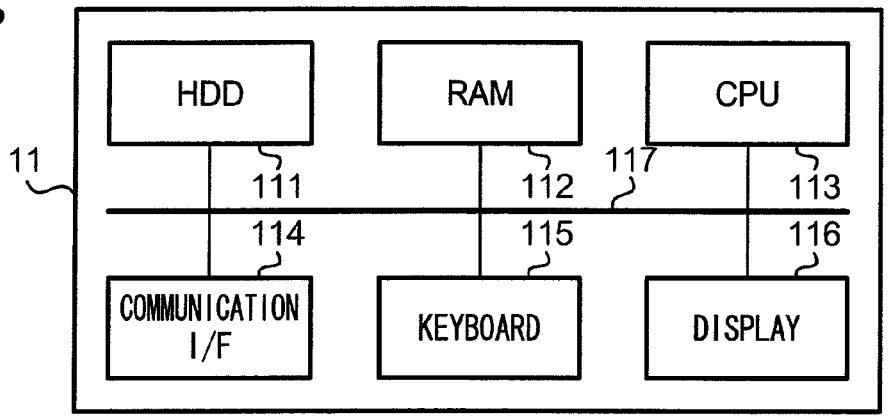
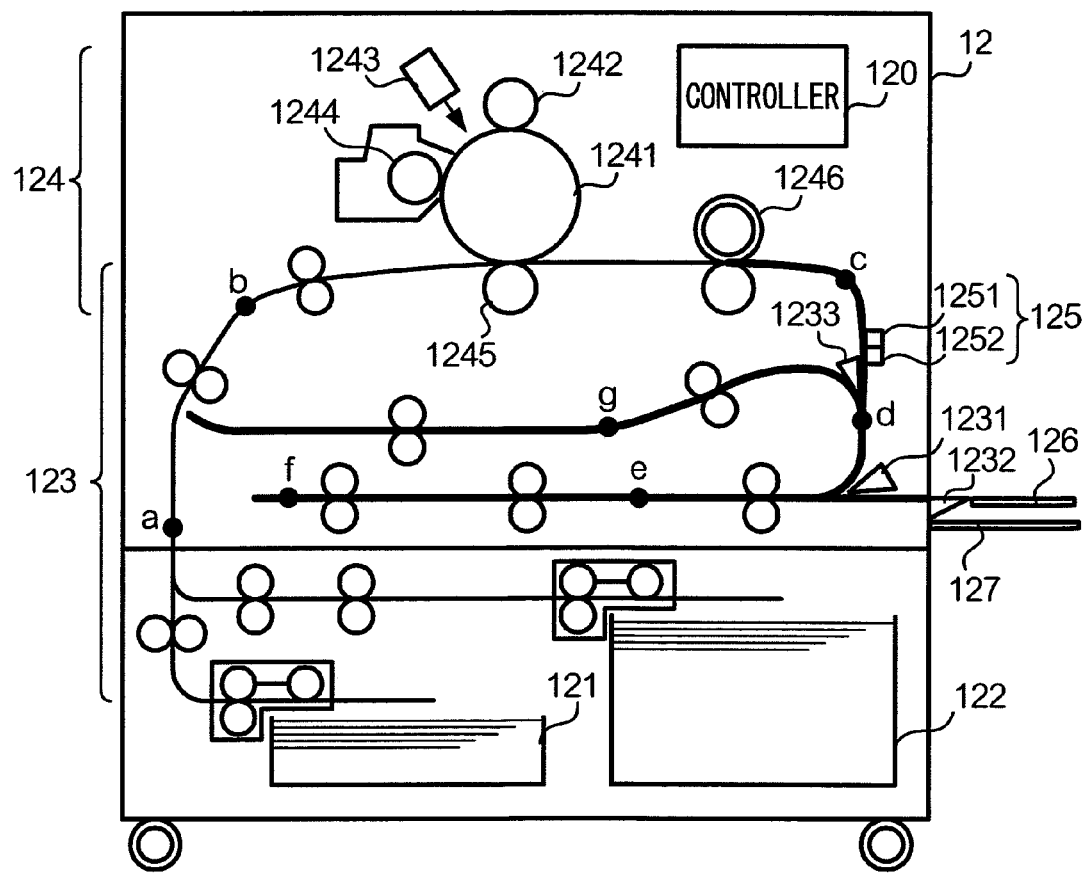

FIG. 9A
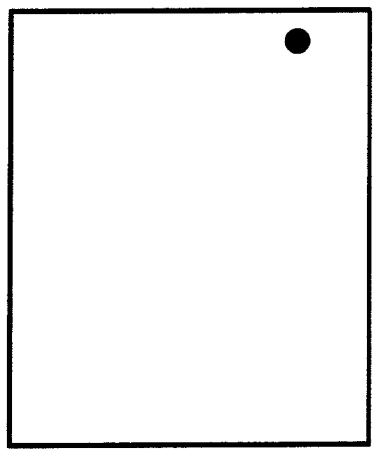
FIG. 9B
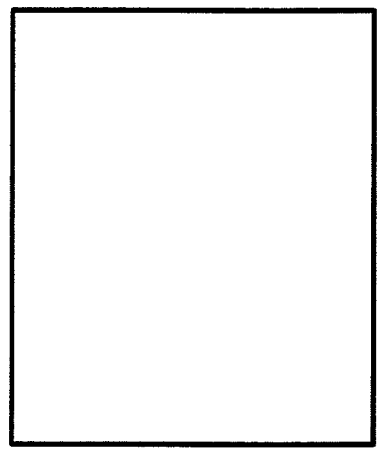
FIG. 10
| PAPER SHEET TYPE | WEIGHT PER SQUARE METER | THRESHOLD |
|---|---|---|
| KENT PAPER | 100 g/m² | 60 |
| KENT PAPER | 120 g/m² | 56 |
| ⋮ | ⋮ | ⋮ |
FIG. 11
| SHOW-THROUGH DENSITY | THRESHOLD |
|---|---|
| 0 | 32 |
| 1 | 32 |
| ⋮ | ⋮ |

FIG. 15A
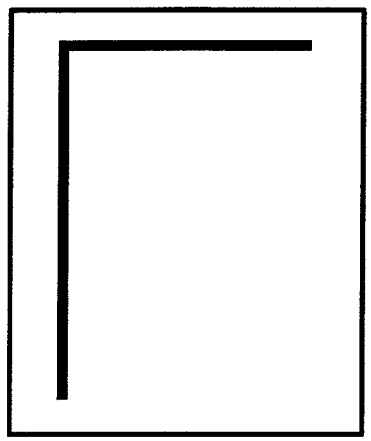
FIG. 15B
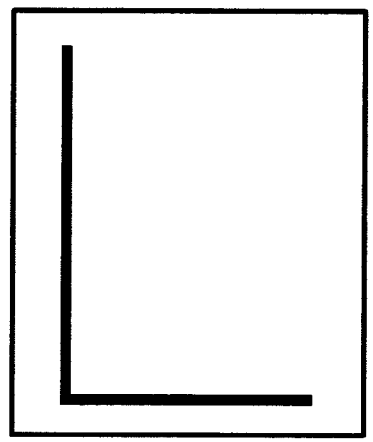
FIG. 16
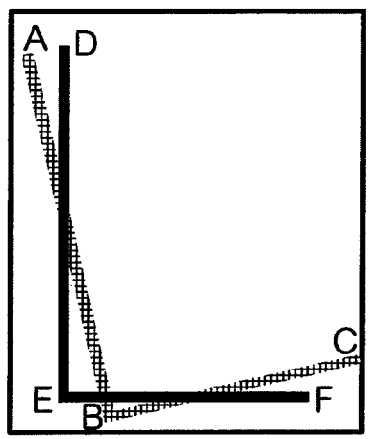
FIG. 21
| FIRST SURFACE DENSITY | SHOW-THROUGH DENSITY |
|---|---|
| 0 | 0 |
| 1 | 0 |
| ⋮ | ⋮ |
FIG. 17
| PAPER SHEET TYPE | WEIGHT PER SQUARE METER | MULTIPLYING FACTOR |
|---|---|---|
| KENT PAPER | 100 g/m$^2$ | 0.20 |
| KENT PAPER | 120 g/m$^2$ | 0.18 |
| ⋮ | ⋮ | ⋮ |

FIG. 18

| REPRESENTATIVE SHOW-THROUGH DENSITY | MULTIPLYING FACTOR |
|---|---|
| 0 | 0.00 |
| 1 | 0.00 |
| ⋮ | ⋮ |

FIG. 19

DRAWING PAPER 80 g/m²
KENT PAPER 120 g/m²
KENT PAPER 100 g/m²

| FIRST SURFACE DENSITY | SHOW-THROUGH DENSITY |
|---|---|
| 0 | 0 |
| 1 | 0 |
| ⋮ | ⋮ |

FIG. 20

REPRESENTATIVE SHOW-THROUGH DENSITY 3
REPRESENTATIVE SHOW-THROUGH DENSITY 2
REPRESENTATIVE SHOW-THROUGH DENSITY 1

| FIRST SURFACE DENSITY | SHOW-THROUGH DENSITY |
|---|---|
| 0 | 0 |
| 1 | 0 |
| ⋮ | ⋮ |

«DATA PROCESSING DEVICE, IMAGE
FORMING DEVICE, SYSTEM, AND A
COMPUTER-READABLE RECORDING
MEDIUM FOR DETERMINING WHETHER
OR NOT IMAGE IS PROPERLY FORMED ON
RECORDING MEDIUM

CROSS-REFERENCE TO RELATED
APPLICATIONS

This application is based on and claims priority under 35 U.S.C. 119 from Japanese Patent Application No. 2007-249475 filed on Sep. 26, 2007.

BACKGROUND

1. Technical Field

The present invention relates to a data processing device, an image forming device, a system, and a program.

2. Related Art

There exists a demand for a technique for determining whether or not an image formed on a recording medium such as a paper sheet has been properly formed and is fault free.

SUMMARY

According to an aspect of the invention, there is provided a data processing device comprising: an obtaining unit that obtains a first image data set, a second image data set, and a property data set, the second image data set being generated by reading an image which is formed on a recording medium in accordance with the first image data set by an image forming device, and the property data set indicating a property of the recording medium; and a specifying unit that determines a threshold for a density difference between the first image data set and the second image data set, depending on the property data set, and specifies, as an error area, an area where the density difference between images expressed by the first and second image data sets is equal to or greater than the threshold.

BRIEF DESCRIPTION OF THE DRAWINGS

Embodiments of the invention will now be described in detail with reference to the following figures, wherein:

FIG. 1 shows a configuration of a system according to the embodiments of the invention;

FIG. 2 shows a configuration of a PC according to the embodiments;

FIG. 3 shows a structure of a data processing device according to the embodiments;

FIG. 9A and FIG. 9B each show an error area according to the first embodiment;

FIG. 10 is a table showing a threshold data set according to the second embodiment of the invention;

FIG. 11 is a table showing a threshold data set according to a modification to the second embodiment;

FIG. 15A and FIG. 15B each show an image expressed by an image data set for specifying a relative positional relationship, according to the third modification to the third embodiment;

FIG. 16 shows an image expressed by a second surface read image data set according to the third modification to the third embodiment;

FIG. 17 is a table showing a multiplying factor data set according to the fourth embodiment of the invention;

FIG. 18 is a table showing a multiplying factor data set according to the first modification to the fourth embodiment;

FIG. 19 shows records of a density conversion data set according to the second modification to the fourth embodiment;

FIG. 20 shows records of a density conversion data set according to the second modification to the fourth embodiment; and FIG. 21 is a table showing a density conversion data set according to the third modification to the fourth embodiment.

DETAILED DESCRIPTION

1. First Embodiment

Figure 4:
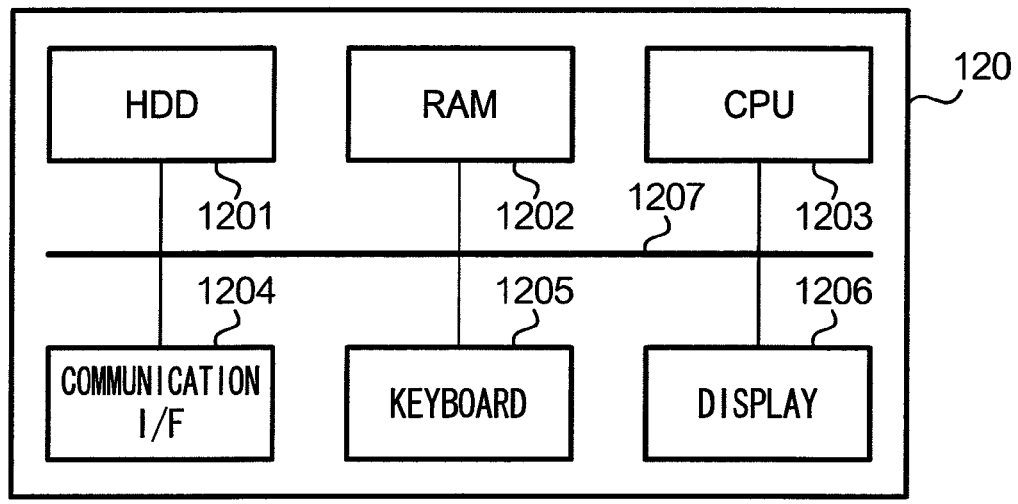
FIG. 4 shows a configuration of a controller according to the embodiments.

A first embodiment of the invention will now be described in detail below.

FIG. 1 shows a configuration of a system 1 according to the first embodiment. The system 1 includes a PC (Personal Computer) 11, and a data processing device 12. The PC 11 functions as a terminal device which a user instructs to form images. The data processing device 12 performs image formation on each of two surfaces of a recording medium in accordance with image data transmitted from the PC 11. The data processing device 12 also selectively distributes recording media to different sheet output trays, depending on whether images have been properly formed or not. The recording media on which the data processing device 12 forms images are, for example, paper sheets, films, and so on. Any recording media are available for use as the recording media insofar as images can be formed on surfaces of the recording media. The following description will be made supposing an example of using paper sheets as the recording media.

FIG. 2 shows a configuration of the PC 11. The PC 11 includes a HDD (Hard Disk Drive) 111, a RAM (Random Access Memory) 112, a CPU (Central Processing Unit) 113, a communication I/F (Interface) 114, a keyboard 115, a display 116, and a bus 117. The HDD 111 stores programs and various data. The RAM 112 temporarily stores data and is used as a work area. The CPU 113 performs various data processings in accordance with programs stored in the HDD 111 so as to control other components of the PC 11. The PC 11 is thereby caused to function as various devices. Through the communication I/F 114, data is transmitted/received to/from external devices. The keyboard 115 generates and outputs signals to the CPU 113 in accordance with input operations of the user, thereby to function as a data input tool for the user. The display 116 displays text and images. The bus 117 connects the components described above to each other. The PC 11 transmits image data stored in the HDD 111 to the data processing device 12 through the communication I/F 114.

In the following description, image data is supposed to have a format in which the density of each of plural pixels constituting one image is expressed in 256 gradation levels, i.e., the density of each pixel is expressed by a gradation value which is any of integers of 0 to 255. Each of such gradation values is an index indicating a density but does not directly represent the density. However, for convenience of explanation and to provide a clear understanding of the description, a "density indicated by a gradation value" will be hereinafter referred to simply as a "density". Image data used in the invention is not limited to image data having a format of expressing densities in 256 gradation levels. Any other format is available insofar as the format is capable of expressing images. For example, one other available format allows an image to be expressed by a set of vector values, each of which indicates an area having a predetermined density. According to a still other available format, image data having any such format as described above is further subjected to a data compression processing or an encryption processing. If a device which performs image formation stores font data, the term "image data" in the invention is intended to include data even of a type in which an image to be formed is specified by writing a layout and a size of text indicated by the font data.

FIG. 3 schematically shows a structure of the data processing device 12. The data processing device 12 has a controller 120 which controls operations and processings of the data processing device 12. FIG. 4 shows a configuration of the controller 120. The controller 120 is a computer included in the data processing device 12, and has a configuration equivalent to the PC 11. That is, the controller 120 has a HDD 1201, a RAM 1202, a CPU 1203, a communication I/F 1204, a keyboard 1205, a display 1206, and a bus 1207 which connects mutually the foregoing components.

Figure 5:
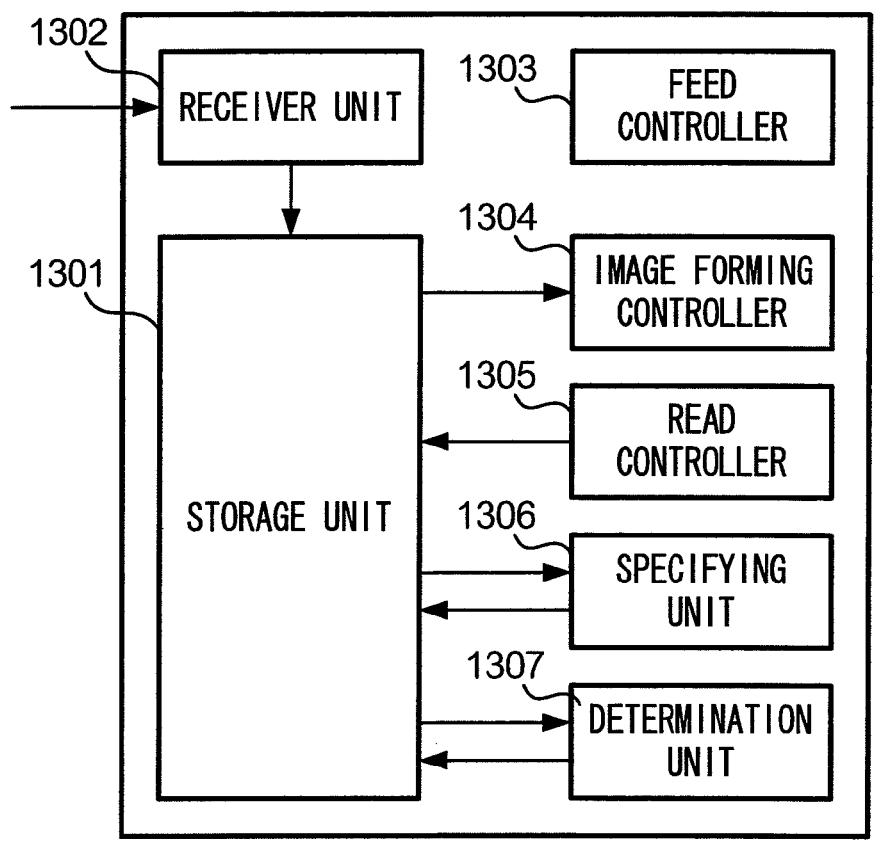
FIG. 5 shows a functional configuration of the controller according to the embodiments.

FIG. 5 shows a functional configuration which is established by the controller 120 when the CPU 1203 of the controller 120 executes an application stored in the HDD 1201. By executing this application, the controller 120 attains a storage unit 1301, a receiver unit 1302, a feed controller 1303, an image forming controller 1304, a read controller 1305, and a specifying unit 1306, and a determination unit 1307, which are established as components constituting the functional configuration. The receiver unit 1302 receives image data transmitted from the PC 11 and causes the storage unit 1301 to store the received image data. The feed controller 1303 controls feed of paper sheets. The image forming controller 1304 controls image formation in accordance with the image data received by the receiver unit 1302 from the PC 11. The read controller 1305 controls image reading. The specifying unit 1306 specifies an area where an image is formed on a paper sheet. The determination unit 1307 determines whether the area specified by the specifying unit 1306 is equal to or smaller than a predetermined threshold or not.

The functional configuration shown in FIG. 5 need not always be established by executing an application by the controller 120. However, components constituting the functional configuration in FIG. 5 can be constructed respectively as hardware components.

Referring back to FIG. 3, the configuration of the data processing device 12 will be further described below. The data processing device 12 has sheet feed trays 121 and 122, a feed mechanism 123, an image forming unit 124, an image read unit 125 (as an image data generation unit), and sheet output trays 126 and 127. The sheet feed trays 121 and 122 each contain paper sheets which have not yet been subjected to image formation. The feed mechanism 123 separates and conveys one after another paper sheets from the stock of paper sheets contained in the sheet feed tray 121 or 122. The image forming unit 124 forms images on surfaces of a paper sheet fed by the feed mechanism 123, in accordance with image data received from the PC 11. The image read unit 125 reads images formed on the surfaces of the paper sheet and generates signals expressing images. The sheet output trays 126 and 127 catch and hold paper sheets fed out of the housing of the data processing device 12.

Under control of the feed controller 1303, the feed mechanism 123 separates an uppermost paper sheet from the stock of paper sheets contained in the sheet feed tray 121 or 122, and feeds the separated paper sheet to a point f through points a, b, c, d, and e along a feed path. Thereafter, under control of the feed controller 1303 as well, the feed mechanism 123 further feeds back the paper sheet in a direction toward the point e from the point f. The feed mechanism 123 under control of the feed controller 1303 feeds out the paper sheet onto the sheet output tray 126 or 127 by switching positions of gates 1231, 1232, and 1233, or feeds the paper sheet again to the point f through points d, g, b, c, d, and e.

In the following description, lower and upper surfaces of each paper sheet contained in the sheet feed tray 121 or 122 as shown in FIG. 3 will be respectively referred to as "first and second surfaces". An edge of each paper sheet, which is situated at a front side in a feed direction when passing through the point a, will be referred to as a "first edge". Another end of each paper sheet, which is situated at a rear side in the feed direction, will be referred to as a "second edge".

While a paper sheet is moved between the points b and c by the feed mechanism 123, the image forming unit 124 forms an image on one surface of the paper sheet under control of the image forming controller 1304. The image forming unit 124 has an image forming mechanism which adopts a dry electrophotographic method. More specifically, the image forming unit 124 includes a photosensitive member 1241, a charge roll 1242, an exposure device 1243, a developing device 1244, a transfer roll 1245, and a fixing device 1246. The photosensitive member 1241 is an image carrier having a photosensitive layer formed on a surface of a cylindrical drum base and revolves about the center axis of the image carrier. The charge roll 1242 comes into contact with the surface of the photosensitive member 1241, and electrically charges the surface to a predetermined potential. The exposure device 1243 illuminates the electrically charged surface of the photosensitive member 1241 with light to form an electrostatic latent image on the surface. The developing device 1244 supplies a developer for the surface of the photosensitive member 1241, to form a toner image on the surface of the photosensitive member 1241. The transfer roll 1245 transfers the toner image formed on the surface of the photosensitive member 1241 to a paper sheet by an electrostatic force or the like. The fixing device 1246 fixes the toner image transferred to the paper sheet, for example, by heat melting.

The image forming unit included in the data processing device 12 is not limited to a unit according to a dry electrophotographic method. A thermal transfer method, a thermosensitive method, a dot impact method, a dry electrophotographic method, or an ink jet method is available for the image forming unit insofar as the image forming unit is provided with an image forming mechanism which is capable of forming an image on a recording medium in accordance with image data transmitted from the PC 11.

While the paper sheet is moved between the points c and d by the feed mechanism 123, the image read unit 125 reads an image from one surface of the paper sheet under control of the read controller 1305, and outputs a signal indicating the read image to the read controller 1305. The image read unit 125 has a light emitter 1251, and a light receiver 1252. The light emitter 1251 has a fluorescent tube and emits light. The light receiver 1252 is a set of plural convergence lenses combined with optical sensors, which are arranged in line to be adjacent to the light emitter 1251. The light emitter 1251 and light receiver 1252 are positioned so that lengthwise directions of the emitter and receiver are oriented substantially vertical to the feed direction of the paper sheet. Light emitted from the light emitter 1251 is reflected on the paper sheet, converged by respective lenses of the light receiver 1252, and received by the light sensors. As a result, the plural light sensors forming part of the light receiver 1252 sequentially output signals which express, as a whole, an image read from one surface side of the paper sheet to the read controller 1305.

The image read unit included in the data processing device 12 is not limited to an optical type. The image read unit can be of any other type insofar as the image read unit is provided with a mechanism capable of generating image data by reading an image formed on a recording medium. For example, an image read unit of another type is capable of magnetically detecting a magnetic material contained in a toner or ink which forms an image on a recording medium; or is capable of electrically detecting a conductive material contained in a toner or ink. In the data processing device 12 shown in FIG. 3, a fixed image read unit 125 reads a surface of a recording medium being fed by the feed mechanism 123. Inversely, a surface of a fixed recording medium can be read by an image read unit 125 being fed by a feed mechanism. Alternatively, an entire surface of a fixed recording medium can be read at one time by a fixed image read unit having optical sensors which are arranged on a plane.

Subsequently, operation of the data processing device 12 will now be described below. A user operates the PC 11 to specify image data expressing an image which the user wishes to form on a recording medium. The PC 11 transmits the specified image data to the data processing device 12. The receiver unit 1302 in the data processing device 12 receives the image data from the PC 11, and stores the received image data in the storage unit 1301. Hereinafter, the image data received from the PC 11 by the data processing device 12 will be referred to as a "received image data set".

Image data can express images for plural pages. The following description will be made on the assumption that, when forming an image, the image forming controller 1304 separates an image data set expressing an image for a target page where the image is to be formed, from an image data set expressing images for plural pages. The separated image data set is supposed to be stored in the storage unit 1301. However, whether the image data set expressing images for plural pages is transmitted/received and stored as one data set or plural data sets is not particularly limited.

Figure 6A:
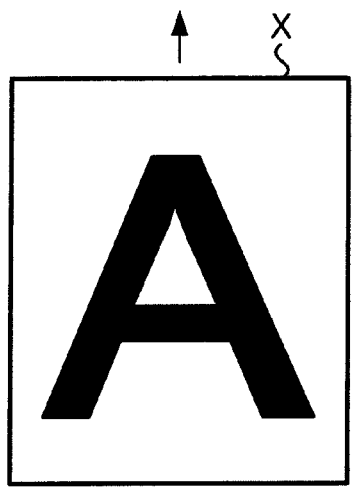
FIG. 6A and FIG. 6B show images expressed by a received image data set according to the embodiments.
Figure 6B:
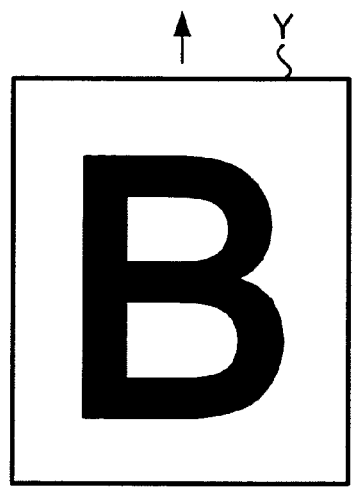

Also in the following description, the data processing device 12 receives an image data set expressing images for two pages as shown in FIG. 6 from the PC 11. FIG. 6A shows an image for a first page, and FIG. 6B shows an image for a second page. A letter "A" included in the first page and a letter "B" included in the second page both have a density of 200. Edges X and Y respectively denote first and second edges of a paper sheet at the time when an image is formed.

After a received image data set expressing images shown in FIG. 6 is stored in the storage unit 1301, the feed controller 1303 separates a paper sheet from a stock of paper sheets in the sheet feed tray 121 or 122. The feed controller 1303 feeds the separated paper sheet so as to reach the point f through the points a, b, c, d, and e.

Also after the received image data set is stored in the storage unit 1301, the image forming controller 1304 separates an image data part expressing an image for a first page from the received image data set, and stores the image data part as a first surface form image data set in the storage unit 1301. When a paper sheet is fed between the points b and c later, the image forming controller 1304 forms an image in accordance with the first surface form image data set. As a result, the image shown in FIG. 6A is formed on the first surface of a paper sheet.

When the paper sheet having an image formed on the first surface is fed between the points c and d, the image read unit 125 reads the first surface and sequentially outputs signals which indicate a read result. The read controller 1305 generates an image data set expressing the image formed on the first surface, in accordance with the signals received from the image read unit 125, and stores the generated image data set as a first surface read image data set in the storage unit 1301.

After the first surface read image data set is stored in the storage unit 1301, the specifying unit 1306 executes a processing described below and thereby specifies, as an error area, an area where a threshold is reached or exceeded by a difference in density between images expressed by the first surface form image data set and the first surface read image data set.

At first, the specifying unit 1306 associates plural pixels constituting the image expressed by the first surface image forming data set, respectively with plural pixels constituting the image expressed by the first surface read image data set. At this time, the image expressed by the first surface read image data set is different from the image expressed by the first surface form image data set, due to deformation which is caused by position offset and/or expansion at the time of forming and reading the image. Accordingly, the specifying unit 1306 makes an inclination correction, an expansion/shrinkage correction, and/or a position correction to the first surface read image data set. The specifying unit 1306 further compares the entire first surface read image data set subjected to such a correction or corrections with the entire first surface form image data set. Then, the specifying unit 1306 specifies the corrected first surface read image data set which results in the greatest conformity with the compared first surface read image data set. The specifying unit 1306 associates pixels included in the corrected first surface read image data set specified in this manner (which will be hereinafter referred to simply as a corrected first surface read image data set), respectively with pixels corresponding in position to the former pixels of the corrected first surface read image data set, among pixels included in the image expressed by the first surface form image data set.

Subsequently, the specifying unit 1306 specifies, as error pixels, pixels which are included in the image expressed by the corrected first surface read image data set and have a density difference not smaller than a predetermined threshold of, for example, 32 from respectively associated pixels included in the image expressed by the image first surface form image data set. The specifying unit 1306 specifies, as an error area, an area which is formed of such error pixels within the image expressed by the first surface read image data set. A specifying processing for specifying an error area is carried out in this manner by the specifying unit 1306. After specifying the error area, the specifying unit 1306 generates an error area specifying data set indicating the error area, and stores the error area specifying data set in the storage unit

1301. The error area specifying data set is constituted of binary image data in which each error pixel is written as "1" (indicating black) and each correct pixel is written as "0" (indicating white). The method which is available for the specifying unit 1306 to generate an error area specifying data set is not limited to the method as described above. Any known method is available for use insofar as the method is capable of associating images expressed by two image data sets with each other and capable of specifying an area where a difference not smaller than a predetermined value exists between the images.

After the error area specifying data set is stored in the storage unit 1301, the determination unit 1307 determines whether or not the area indicated by the error area specifying data set reaches or exceeds a predetermined threshold of, for example, 0.1% of an entire area of the image expressed by the corrected first surface read image data set. If the error area is determined to reach or exceed the threshold, the determination unit 1307 stores data "NG" indicating a determination result in the storage unit 1301. Otherwise, if the area of the error area is determined to be smaller than the threshold, the determination unit 1307 stores data "OK" indicating another determination result in the storage unit 1301.

If the data "NG" is stored in the storage unit 1301, the feed controller 1303 controls the feed mechanism 123 so that the paper sheet is fed in a direction toward the point e from the point f and is fed out onto the sheet output tray 127. In addition, the feed controller 1303 controls the feed mechanism 123 so that a new paper sheet is fed to the image forming unit 124 from the sheet feed tray 121 or 122.

Otherwise, if the data "OK" is stored in the storage unit 1301, the feed controller 1303 controls the feed mechanism 123 so that the paper sheet is fed in a direction toward the point e from the point f and supplied again to the image forming unit 124 through the points d, g, and b. Thereafter, the feed controller 1303 controls the feed mechanism 123 so that the paper sheet reaches again the point f through the points c, d, and e. When the paper sheet is fed again to the image forming unit 124 after forming one image on the first surface, the paper sheet is oriented with the second edge situated in the front side along the feed direction. At this time, the second surface faces the photosensitive member 1241.

If the data "NG" is stored in the storage unit 1301, the image forming controller 1304 controls the image forming unit 124 so as to retry formation of an image on a newly supplied paper sheet in accordance with the first surface form image data set. Otherwise, if the data "OK" is stored in the storage unit 1301, the image forming controller 1304 separates an image data set expressing an image for a second page as a second surface form image data set, from the received image data set, and stores the second surface form image data set in the storage unit 1301. Thereafter, the image forming controller 1304 controls the image forming unit 124 so as to form an image on a second surface of the fed paper sheet having the first surface on which an image has already been formed, in accordance with the second surface form image data set. As a result, an image as shown in FIG. 6B is formed on the second surface of the paper sheet.

If the data "NG" is stored in the storage unit 1301, the read controller 1305 causes the storage unit 1301 to store again, as a new first surface read image data set, image data which is newly generated in accordance with signals which the image read unit 125 generates by reading a new paper sheet fed later to the image read unit 125. Otherwise, if the data "OK" is stored in the storage unit 1301, the read controller 1305 causes the storage unit 1301 to store, as a second surface read image data set, image data which is generated in accordance with signals which the image read unit 125 generates by reading the same paper sheet fed again to the image read unit 125.

If the new first surface read image data set is stored again in the storage unit 1301 as described above, the specifying unit 1306 repeats the generation processing described previously for generating an error area specifying data set for the first surface. Otherwise, if the second surface read image data set is stored in the storage unit 1301, the specifying unit 1306 uses the second surface form image data set and the second surface read image data set to generate an error area specifying data set for the second surface. The specifying unit 1306 then stores the generated error area specifying data set in the storage unit 1301.

A generation processing for further generating an error area specifying data set for the second surface is carried out substantially in the same manner as the foregoing generation processing for generating an error area specifying data set for the first surface, which the specifying unit 1306 carries out by using a first surface form image data set and a first surface read image data set. However, each of these generation processings utilize respectively different thresholds. In the generation processing for generating an error area specifying data set for the first surface, as described above, the specifying unit 1306 specifies, as an error area, an area where a density difference is not smaller than 32 between images expressed by a first surface form image data set and a corrected first surface read image data set. In the other generation processing for generating an error area specifying data set for the second surface, the specifying unit 1306 specifies, as an error area, an area where a density difference is not smaller than 64 between images expressed by a second surface form image data set and a corrected second surface read image data set. The corrected second surface read image data set is obtained by, for example, performing an inclination correction on a second surface read image data set.

Values of the above thresholds used by the specifying unit 1306 are examples and can be arbitrarily changed insofar as the threshold used in the generation processing for generating an error area specifying data set for the second surface is greater than the other threshold used in the generation processing for generating an error area specifying data set for the first surface.

After an error area specifying data set is stored in the storage unit 1301, the determination unit 1307 determines whether a predetermined threshold is reached or exceeded by the error area expressed by the error area specifying data set or not. When a determination is made on an error area specifying data set for the first surface, the determination unit 1307 then stores data "NG" or "OK" indicating a determination result in the storage unit 1301. On the other side, when a determination is made on an error area specifying data set for the second surface, the determination unit 1307 then stores, in the storage unit 1301, data "NG" if the error area is not smaller than a predetermined threshold, or stores data "CLR" if the error area is smaller than the predetermined threshold.

After the data "NG" is stored in the storage unit 1301, the data processing device 12 operates as described above. In other words, the data processing device 12 feeds out the paper sheet onto the sheet output tray 127, and then retries image formation on a first surface of a new paper sheet.

If the data "CLR" is stored in the storage unit 1301, the feed controller 1303 controls the feed mechanism 123 so that the paper sheet is fed in a direction toward the point e from the point f and is fed out onto the sheet output tray 126. The data processing device 12 then completes a series of processings.

Figure 7A:
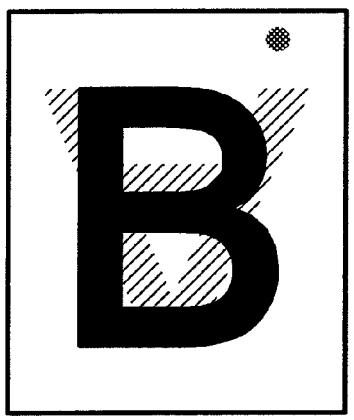
FIG. 7A and FIG. 7B show an image expressed by a second surface read image data set according to the embodiment.
Figure 7B:
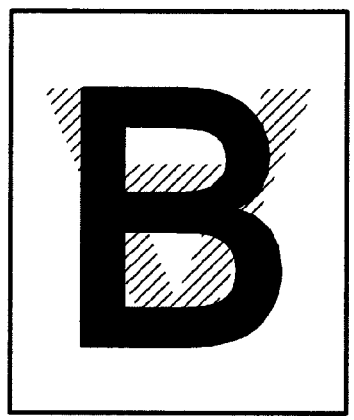

FIG. 7 show examples of images which are expressed by a second surface read image data set generated by the data processing device 12. The second surface read image data set is image data which is generated by reading the second surface of a paper sheet on which an image has been formed after proper completion of image formation on the first surface of the paper sheet. FIG. 7A shows an image expressed by a second surface read image data set in a case where image formation on the second surface has failed and caused a circular black stain to remain on the second surface. The stain is supposed to have a density of 80. FIG. 7B shows an image expressed by a second surface read image data set in a case where image formation on the second surface has been completed properly.

As shown in FIG. 7, in each image expressed by a second surface read image data set, a 180-degree rotated mirror image of an image expressed by a first surface read image data appears mixed with an image actually formed on the second surface. The mirror image has a lower density than the original image. This is because the original image which has been formed on the first surface is seen through the paper sheet from the second surface side. Hereinafter, such an image which is seen through the paper sheet from an opposite side will be referred to as a "show-through image", and the density of the show-through image will be referred to as a "show-through density".

The show-through density varies depending on: a density of an image formed on the first surface; a density of overlapping part of an image formed on the second surface which overlaps a show-through image; an intensity of light which illuminates the paper sheet from the first surface side; and properties of the paper sheet such as a type and thickness of the paper sheet. For explanatory convenience aiming for clear understanding of the description made below, the show-through density is supposed to be 20% of the density of an image formed on the first surface. The density of an area where a show-through image overlaps an image formed on the second surface is supposed to be a sum of a show-through density and a density of an image formed on the second surface. For example, if an image having a density of 200 is formed at a position on the first surface and if no image is formed at the same position on the second surface, the density of an image which is seen (or read or scanned) at the same position from the second surface side is 200*20%=40. As an alternative, if an image having a density of 200 is formed at a position on the first surface and if an image having a density of 200 is also formed at the same position on the second surface, the density of an image which is seen (or read or scanned) at the same position from the second surface side is 240, which is a sum of the show-through density of 40 and the density of 200 of the image formed on the second surface.

Accordingly, in each of the images shown in FIG. 7, part of the show-through image which does not overlap a letter "B" has a density of 40, while part of the show-through image which overlaps the letter "B" has a density of 240.

Figure 8A:
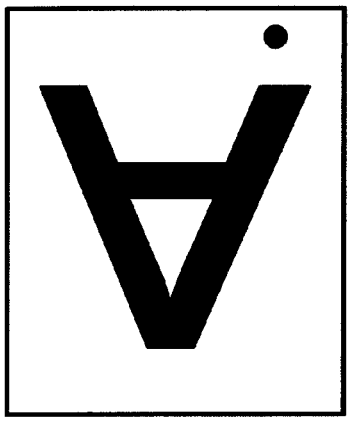
FIG. 8A and FIG. 8B show error areas for use in explaining the first embodiment of the invention.
Figure 8B:
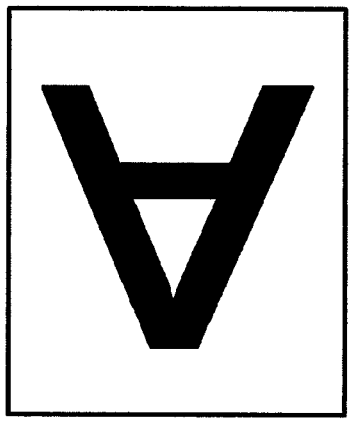

FIG. 8 show error areas which are specified supposing that the same threshold of 32 as is used for specifying an error area for the first surface is also used as a threshold for specifying an error area for the second surface by the specifying unit 1306 under conditions as described above. FIGS. 8A and 8B are respectively associated with FIGS. 7A and 7B. As shown in FIG. 8, if the threshold of 32 is used to specify an error area for the second surface, the area of each show-through image is specified to be included in an error area. In this case, the determination unit 1307 incorrectly determines that even the image shown in FIG. 7B which contains no stain on the second surface is an improperly formed image.

However, the specifying unit 1306 changes the threshold used for specifying an error area for the second surface to 64 from 32 which is a threshold used for the first surface. Therefore, error areas which are actually specified for the second surface by the specifying unit 1306 are as shown in FIG. 9. FIGS. 9A and 9B are respectively associated with FIGS. 7A and 7B. As shown in FIG. 9, the area of each show-through image is not specified to be included in an error area. Accordingly, the determination unit 1307 correctly determines that the image shown in FIG. 7A which contains a stain image on the second surface is an improperly formed image while the image shown in FIG. 7B containing no stain image on the second surface is a properly formed image.

In the above description, the threshold used for specifying an error area for the second surface is used in common to all paper sheets supplied from both the sheet feed trays 121 and 122. However, the data processing device 12 can be alternatively configured so as to use different thresholds depending on whether a paper sheet is fed from the sheet feed tray 121 or 122.

2. Second Embodiment

Next, the second embodiment of the invention will be described below. The second embodiment has lots of common features to the configuration and operation of the first embodiment. Therefore, only differences to the first embodiment will be described below, and a reiterative explanation to such common features will be omitted from the description made below.

Differences between a system 2 according to the second embodiment and the system 1 exist in the data stored in the storage unit 1301 and the processings carried out by the specifying unit 1306.

The storage unit 1301 in the system 2 stores in advance a threshold data set indicating thresholds which are used for specifying an error area by the specifying unit 1306. FIG. 10 is a table which shows an example of content of the threshold data set. The threshold data set includes plural records each of which includes data indicating a paper sheet type, a weight per square meter, and a threshold associated with a combination of the paper sheet type and the weight per square meter. The paper sheet type and the weight per square meter are examples of properties of paper sheets. In stead of these properties, for example, a thickness, a color, and a density of a paper sheet can be taken as properties of the paper sheet.

A user specifies a paper sheet type and a weight per square meter of a paper sheet to be used for image formation, for example, by operating the keyboard 1205. Thereafter, image data is transmitted to the data processing device 12 from the PC 11 in accordance with operations of the user. The data processing device 12 in the system 2 then performs the same processing as the data processing device 12 in the system 1 except for the difference described below.

The difference between the data processings of the data processing devices 12 in the systems 1 and 2 is that, when specifying an error area for the second surface, the specifying unit 1306 does not use a predetermined fixed threshold but uses a threshold associated with a combination of a paper sheet type and a weight per square meter of the paper sheet. For example, there is a case that a user specifies "Kent paper" and "120 g/m$^2$". In this case, the specifying unit 1306 searches the threshold data set for an associated record by using "Kent paper" and "120 g/m$^2$" as search keys. From a record obtained as a search result, the specifying unit 1306 obtains a threshold of 56. The specifying unit 1306 uses the obtained threshold of 56 for specifying an error area for the second surface.

For example, there is a case that FIG. 7A shows an image expressed by a second surface read image data set obtained by performing image formation on a Kent paper of 120 g/m² and the density of a stain image is 60 which is lower than that in the first embodiment. The other part of the image shown in FIG. 7A than the stain image is the same density as that in the first embodiment. If the density of the stain image is thus smaller than 64, the data processing device 12 in the system 1 does not specify the area of the stain image to be included in an error area. Consequently, the data processing device 12 in the system 1 erroneously determines that the image shown in FIG. 7A including a stain image is a properly formed image. In contrast, the data processing device 12 in the system 2 uses the threshold of 56 which is determined depending on properties of the paper sheet, as a threshold for specifying an error area. Therefore, the data processing device 12 in the system 2 is capable of specifying the area of the stain image to be included in an error area. Accordingly, the image shown in FIG. 7A including a stain image is correctly determined to be an improperly formed image.

2-1. Modification

The second embodiment described above can be modified as follows. In the modification below, the user need not specify a paper sheet or a weight per square meter but the data processing device 12 automatically specifies a property of a paper sheet and determines a threshold used for specifying an error area.

In the modification, a threshold data set shown in FIG. 11 is pre-stored in place of the threshold data set shown in FIG. 10. The threshold data set shown in FIG. 11 indicates thresholds associated with show-through densities in case where an image having a density of 255 causes a show-through.

A first surface read image data set, a second surface form image data set, and a second surface read image data set are generated as image formation is carried out normally. The specifying unit 1306 specifies, as a show-through density of a image read from the second surface, a density of part of the read image where an image having a density of 255 is formed on the first surface and no image is formed on the second surface.

The specifying unit 1306 searches the threshold data set for an associated record by using as a search key the show-through density specified as described above. From a record obtained as a search result, a threshold is obtained. The specifying unit 1306 uses the threshold obtained by the search when specifying an error area for the second surface.

If the first surface does not include an image having the density of 255, the specifying unit 1306 determines a show-through density of an image having the density of 255, on the basis of a show-through density of an image having a different density from 255, for example, by using a predetermined calculation expression and/or conversion data. Alternatively, the specifying unit 1306 directly determines an appropriate threshold from a show-through density of an image having a different density, for example, by using a predetermined calculation expression and/or conversion data.

As described above, a threshold data set is searched for a threshold by using as a search key a show-through density specified on the basis of a first surface read image data set, a second surface form image data set, and a second surface read image data set. However, the specifying unit 1306 can be alternatively configured so that the threshold is determined from the specified show-through density by using a predetermined calculation expression in place of carrying out such a search.

Still alternatively, the data processing device 12 can be configured so as to execute image formation and image reading for specifying a show-through density, in place of specifying a show-through density on the bases of a first surface read image data set, a second surface form image data set, and a second surface read image data set which are generated as image formation is carried out normally. In this case, an image data set for determining show-through density including an image having a density of 255 is pre-stored in the storage unit 1301. In response to an operation of a user, the data processing device 12 forms an image on the first surface in accordance with the image data set for determining a show-through density. Further, a second surface read image data set is generated by reading the second surface without forming an image on the second surface. The specifying unit 1306 specifies a show-through density on the bases of the generated second surface read image data set and the image data set for determining a show-through density.

Still alternatively, the data processing device 12 can be configured as follows in place of specifying a show-through density as described above on the bases of a first surface read image data set, a second surface form image data set, and a second surface read image data set which are generated as image formation is carried out normally. That is, a light emitter and a light receiver are positioned near the point a so that the light emitter and the light receiver face each other sandwiching a feed path for paper sheets in between. A threshold used for specifying an error area is determined by using an intensity of light which is indicated by a signal which is generated from the light receiver. In this case, the light emitter emits light of a predetermined intensity when a paper sheet passes by. The light receiver receives light which penetrates through the paper sheet and is part of the light emitted from light emitter. The light receiver then outputs a signal indicating an intensity of the received light to the specifying unit 1306. A threshold data set indicating thresholds associated with light intensities in place of show-through densities is stored in advance in the storage unit 1301. The specifying unit 1306 searches the threshold data set for an associated record by using, as a search key, the light intensity indicated by the signal received from the light receiver. A threshold is obtained from a record which is obtained as a search result. As an alternative, the specifying unit 1306 determines a threshold from the light intensity indicated by the signal received from the light receiver, by using a predetermined calculation expression.

3. Third Embodiment

Next, the third embodiment of the invention will be described below. The third embodiment has lots of common features to the configuration and operation of the second embodiment (including modifications). Therefore, only differences to the second embodiment will be described below, and a reiterative explanation to such common features will be omitted from the description made below.

Differences between a system 3 according to the third embodiment and the system 2 exist in processings which are carried out by the specifying unit 1306 and the determination unit 1307.

In the description made below, the image shown in FIG. 6A is an image expressed by a first surface form image data set. The image show in FIG. 6B is an image expressed by a second surface form image data set. The image shown in FIG. 7A or 7B is an image expressed by a second surface read image data set. Densities of letters and a stain image shown in FIGS. 6 and 7 are supposed to be the same as those in the first embodiment. That is, the letters "A" and "B" have a density of 200. Show-through images have a density of 40. Part where the letter "B" and a show-through image overlap each other has a density of 240. The stain image has a density of 80.

A difference between the first surface form image data set and the first surface read image data set is supposed to be negligibly small. That is, the image shown in FIG. 6A is supposed to be the image expressed by the first surface read image data set. Therefore, the first surface form image data set and the first surface read image data set are interchangeable with each other in the description below. If position offset and/or expansion of a paper sheet is too large to neglect, the specifying unit 1306 uses a corrected first surface read image data set in place of the first surface read image data set. The corrected first surface read image data set has been corrected so as to eliminate influence of position offset and/or expansion of a paper sheet.

Figure 12:
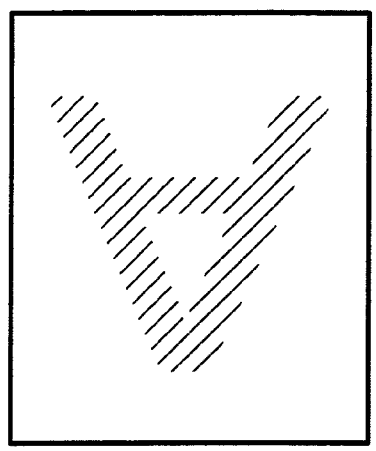
FIG. 12 shows an image expressed by an approximate show-through image data set according to the third embodiment of the invention.

Before specifying an error area for the second surface, the specifying unit 1306 in the system 3 moves positions of pixels forming an image expressed by a first surface read image data set respectively to diagonal positions, respectively. In addition, the specifying unit 1306 multiplies the density of each of the pixels by a predetermined multiplying factor, such as 0.15 (15%), to generate an approximate show-through image data set. FIG. 12 shows an image expressed by the approximate show-through image data set. The image expressed by the approximate show-through image data set has a density of 30 (200*0.15=30).

Alternatively, a conversion data set for converting the density of the first surface into a show-through density can be pre-stored in the storage unit 1301. The specifying unit 1306 can be configured so as to generate an approximate show-through image data set In accordance with the conversion data set in place of using a multiplying factor.

Figure 13:
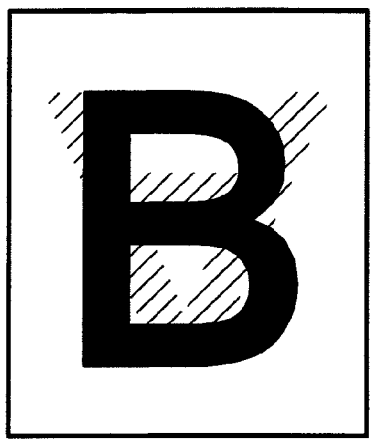
FIG. 13 shows an image expressed by a comparative image data set according to the third embodiment.

Subsequently, the specifying unit 1306 adds densities of pixels forming an image expressed by the approximate show-through image data set respectively to densities of pixels forming an image expressed by the second surface form image data set, thereby to generate a comparative image data set. FIG. 13 shows an image expressed by the comparative image data set. In the image expressed by the comparative image data set, the letter "B" has a density of 200, and the show-through density is 30. Overlapping part between these images has a density of 230.

Subsequently, the specifying unit 1306 specifies an error area by using the comparative image data set and the second surface read image data set. A processing which the system 3 performs to specify an error area by use of the comparative image data set and the second surface read image data set is the same as the processing which the system 1 specifies an error area by using the second surface form image data set and the second surface read image data set.

Specifically, the specifying unit 1306 specifies, as an error area, an area where a density difference not smaller than 32 exists between pixels included the image expressed by the comparative image data set and pixels included in the image expressed by the second surface read image data set. As a result, the same images as shown in FIG. 9 each are obtained as an image expressed by an error area specifying data expressing the error area. Accordingly, the determination unit 1307 correctly determines that the image of FIG. 7A including a stain image is an improperly formed image while the image of FIG. 7B is a properly formed image.

3-1. First Modification

The third embodiment as described above can be modified as follows. The following modification to the third embodiment will be referred to as a "first modification".

In the first modification, the specifying unit 1306 uses a different comparative image data set from that used in the third embodiment. The specifying unit 1306 generates an approximate show-through read image data set. Thereafter, the specifying unit 1306 performs an inclination correction, an expansion/shrinkage correction, and/or a position correction to a second surface read image data set so as to eliminate differences caused by position offset and/or expansion of a paper sheet between an show-through image expressed by the second surface read image data set and an image expressed by the approximate show-through read image data set. A corrected second surface read image data set is thereby generated. A processing which the specifying unit 1306 performs to generate the corrected second surface read image data set from the approximate show-through image data set and the second surface read image data set is the same as the processing for generating a corrected first surface read image data set from a first surface form image data set and a first surface read image data set.

Subsequently, the specifying unit 1306 subtracts densities of pixels forming the image expressed by the approximate show-through image data set, respectively, from densities of pixels forming the image expressed by the corrected second surface read image data set, thereby to generate a comparative image data set. In the first modification, the image expressed by the comparative image data set generated by the specifying unit 1306 has the same shape as shown in FIG. 13. The letter "B" has a density of 200, and the show-through density is 10 (40−30=10). Overlapping part between the letter "B" and the show-through image has a density of 210 (240−30=210)

Subsequently, the specifying unit 1306 specifies an error area by using a second surface form image data set and the comparative image data set. Specifically, the specifying unit 1306 specifies, as an error area, an area where a density difference is not smaller than 32 between pixels forming images expressed by the second surface form image data set and the comparative image data set. As a result, the same images as shown in FIG. 9 each are obtained as an image expressed by an error area specifying data set expressing the error area. Accordingly, the determination unit 1307 correctly determines that the image of FIG. 7A including a stain image is an improperly formed image while the image of FIG. 7B is a properly formed image.

3-2. Second Modification

The third embodiment as described above can be differently modified as follows. The following modification to the third embodiment will be referred to as a "second modification".

In the second modification, the specifying unit 1306 uses a different comparative image data set from that used in the third embodiment. Before or after generating an approximate show-through read image data set, the specifying unit 1306 performs an inclination correction, an expansion/shrinkage correction, and/or a position correction to a second surface read image data set so as to eliminate differences caused by position offset and/or expansion of a paper sheet between an image formed on the second surface, which is expressed by the second surface read image data set, and an image expressed by a second surface form image data set. A corrected second surface read image data set is thereby generated. A processing which the specifying unit 1306 performs to generate the corrected second surface read image data set from the second surface form image data set and the second surface read image data set is the same as the processing for generating a corrected first surface read image data set from a first surface form image data set and a first surface read image data set.

Figure 14A:
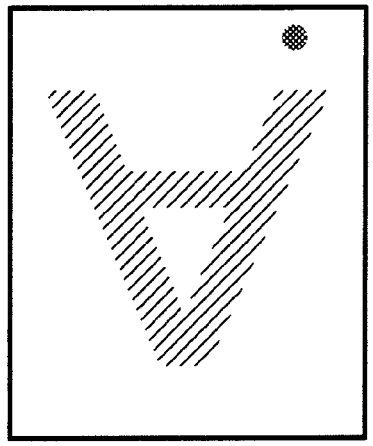
FIG. 14A and FIG. 14B each show an image data set expressed by a comparative image data set according to the second modification to the third embodiment.
Figure 14B:
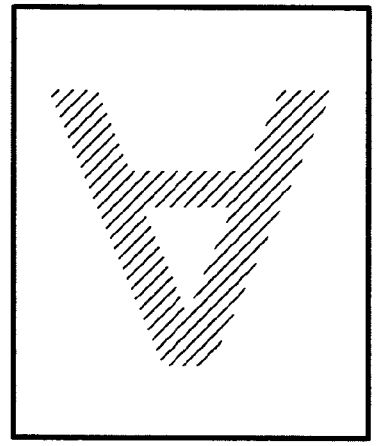

Subsequently, the specifying unit 1306 subtracts densities of pixels forming the image expressed by the second surface read image data set, respectively from densities of pixels forming the image expressed by the second surface form image data set, thereby to generate a comparative image data set. FIGS. 14A and 14B show images each expressed by a comparative image data set generated by the specifying unit 1306. FIGS. 14A and 14B are respectively associated with FIGS. 7A and 7B. In FIG. 14, the show-through density is 40, and a stain image has a density of 80.

Subsequently, the specifying unit 1306 specifies an error area by using an approximate show-through image data set and the comparative image data set. Specifically, the specifying unit 1306 specifies, as an error area, an area where a density difference is not smaller than 32 between pixels forming images expressed by the approximate show-through image data set and the comparative image data set. As a result, the same images as shown in FIG. 9 each are obtained as an image expressed by an error area specifying data set expressing the error area. Accordingly, the determination unit 1307 correctly determines that the image of FIG. 7A including a stain image is an improperly formed image while the image of FIG. 7B is a properly formed image.

3-3. Third Modification

The third embodiment as described above can be differently modified as follows. The following modification to the third embodiment will be referred to as a "third modification".

The system 3 according to the above third embodiment successfully functions without problems in a case that a relative positional relationship between a show-through image of an image formed on the first surface and an image formed on the second surface substantially agrees with a relative positional relationship between a 180-degree rotated mirror image of an image expressed by a first surface form image data set and an image expressed by a second surface form image data set.

However, there is a case that a difference which is too large to neglect appears between the two relative positional relationships described above due to position offset and/or expansion of a paper sheet. In this case, there is a possibility that the system 3 according to the third embodiment (including the first and second modifications) cannot distinguish an image which is formed properly with expected precision from an image which is formed improperly, when a determination is made on the second surface.

To eliminate such a failure to distinguish an image, the specifying unit 1306 in the third modification uses a corrected approximate show-through image data set in place of an approximate show-through image data set when generating a comparative image data set. The corrected approximate show-through image data set has been corrected so as to eliminate influence of position offset and/or expansion of a paper sheet.

In order to generate the corrected approximate show-through image data set, the specifying unit 1306 needs to specify how the relative positional relationship between images formed on the first and second surfaces differs from an ideal positional relationship. Therefore, in the third modification, the storage unit 1301 stores in advance an image data set for specifying a relative positional relationship. The image data set expresses images as shown in FIG. 15. FIGS. 15A and 15B respectively show images to be formed on the first and second surfaces. Each one of the images shown in FIGS. 15A and 15B is a 180-degree rotated mirror image of the other one.

In accordance with operations of a user, the data processing device 12 performs image formation on the first and second surfaces, and reads the second surface to generate a second surface read image data set. FIG. 16 shows an image expressed by a second surface read image data set which is generated in this manner. In FIG. 16, line segments AB and BC indicate one show-through image, and line segments DE and EF indicate one image formed on the second surface.

The specifying unit 1306 generates a longitudinal expansion/shrinkage ratio data set indicating a ratio of the length of the line segment AB to the length of the line segment DE, and a lateral expansion/shrinkage ratio data set indicating a ratio of the length of the line segment BC to the length of the line segment EF. The specifying unit 1306 then stores the generated data sets in the storage unit 1301. The specifying unit 1306 further generates an inclination angle data set indicating an inclination angle of the line segment AB, relative to the line segment DE taken as a reference, and stores the inclination angle data set in the storage unit 1301. The specifying unit 1306 generates a shift vector data set indicating a shift vector which is defined by the point E as a start point and the point B as an end point. The specifying unit 1306 also stores the shift vector data set in the storage unit 1301.

When generating thereafter a comparative image data set as image formation is performed, the specifying unit 1306 performs an expansion/shrinkage processing, a rotation processing, and a shift processing on an image expressed by the approximate show-through image data set. The expansion/shrinkage processing is carried out on the basis of longitudinal and lateral expansion/shrinkage ratios indicated by the longitudinal expansion/shrinkage ratio data set and the lateral expansion/shrinkage ratio data set. The rotation processing is carried out on the basis of an inclination angle indicated by the inclination angle data set. The shift processing is carried out in a direction according to a vector indicated by the shift vector data set. The specifying unit 1306 hence generates, as a corrected approximate show-through image data set, an image data set expressing an image subjected to the processings described above.

The specifying unit 1306 further generates a comparative image data set by using the corrected approximate show-through image data set in place of the approximate show-through image data set. That is, the specifying unit 1306 generates the comparative image data set by adding densities of pixels forming an image expressed by the corrected approximate show-through image data set, respectively to densities of pixels forming an image expressed by the second surface form image data set.

The method for specifying a relative positional relationship between images on the first and second surfaces is not limited to the method as described above. For example, a corrected first surface read image data set is generated, when to compare an image expressed by a first surface form image data set with an image expressed by a first surface read image data set. Further, a corrected second surface read image data set is generated when to compare an image expressed by a second surface form image data set with an image expressed by a second surface read image data set. When corrections are made to obtain such corrected data sets, the specifying unit 1306 specifies degrees of position offset, inclination, and expansion for each of the first and second surfaces. The specifying unit 1306 can be configured so as to specify a relative positional relationship between the images on the first and second surfaces, in accordance with the specified degrees of position offset, inclination, and expansion for each of the first and second surfaces.

In the modification as described above, a corrected approximate show-through image data set is used in place of an approximate show-through image data set, when generating a comparative image data set. As an alternative, however, the specifying unit 1306 can be configured so as to generate a corrected second surface form image data set by subjecting a second surface form image data set to inverse corrections of the above corrections made to an approximate show-through image data set. The specifying unit 1306 further uses the corrected second surface form image data set in place of the second surface form image data set. That is, which of image data sets is to be subjected to corrections for eliminating position offset, expansion, and the like can be arbitrarily selected.

In the third embodiment and the above first and second modifications, addition or subtraction of densities is carried out between an image expressed by an approximate show-through image data set generated by a first surface read image data set, and an image expressed by a second surface read image data set. The specifying unit 1306 can be alternatively configured so as to correct and then use the approximate show-through image data set or the second surface read image data set, when performing the addition or subtraction. At this time, the approximate show-through image data set or the second surface read image data set is corrected so that four corners of one of paper sheets expressed by these two image data sets are identical to four corners of the other one of the paper sheets. Position offset between images on the first and second surfaces can also be eliminated by making such a correction.

3-4. Fourth Modification

The third embodiment as described above can be still differently modified as follows. The following modification to the third embodiment will be referred to as a "fourth modification".

In the fourth modification, the specifying unit 1306 generates an error area specifying data set, and thereafter calculates an index indicating a degree of correlation between image areas expressed by the error area specifying data set and an approximate show-through image data set. For example, the index is a correlation coefficient. If the calculated correlation coefficient is higher than a predetermined value, the specifying unit 1306 corrects a multiplying factor used for generating the approximate show-through image data set, by adding a predetermined value of 0.01 to the multiplying factor. The specifying unit 1306 thereafter regenerates an approximate show-through image data set. The specifying unit 1306 then specifies again an error area by using the regenerated approximate show-through image data set.

There is a case that the specifying unit 1306 does not use a multiplying factor but is configured, instead, so as to generate an approximate show-through image data set in accordance with a conversion data set for converting the density of an image on the first surface into a show-through density. In this case, the specifying unit 1306 generates an error area specifying data set. If an index indicating a degree of correlation between image areas expressed by the error area specifying data set and the approximate show-through image data set is higher than a predetermined value, the specifying unit 1306 corrects the show-through density indicated by multiplying the show-through density by, for example, 1.05. The specifying unit 1306 then regenerates an approximate show-through image data set. Thereafter, the specifying unit 1306 specifies again an error area by using the regenerated approximate show-through image data set.

The specifying unit 1306 is thus configured so as to correct a multiplying factor or a show-through density indicated by a conversion data set from the following ground. That is, if an image expressed by an approximate show-through image data set has a lower density than an actual show-through image due to an improper multiplying factor or an improper conversion data set, the area of a show-through image is incorrectly specified to be included in an error area. Hence, the density of an image expressed by the approximate show-through image data set is increased in order to attain a proper multiplying factor or a proper conversion data set.

When specifying an error area later, the specifying unit 1306 can use either a multiplying factor not corrected or a corrected multiplying factor repeatedly or either a conversion data set not corrected or a corrected conversion data set repeatedly.

4. Fourth Embodiment

Next, the fourth embodiment of the invention will now be described below. The fourth embodiment has lots of common features to the configuration and operation of the third embodiment. Therefore, only differences to the third embodiment will be described below, and a reiterative explanation to such common features will be omitted from the description made below.

Differences between a system 3 according to the fourth embodiment and the system 3 exist in the data stored in the storage unit 1301 and the processings carried out by the specifying unit 1306.

The storage unit 1301 in the system 4 pre-stores a multiplying factor data set indicating multiplying factors which the specifying unit 1306 uses to generate an approximate show-through image data set, respectively associated with combinations each constituted of a paper type and a weight per square meter. FIG. 17 is a table showing an example of content of the multiplying factor data set. The multiplying factor data set includes plural records each of which includes data indicating a paper sheet type, a weight per square meter of a paper sheet, and a multiplying factor associated with a combination of the paper sheet type and the weight per square meter.

A user of the system 4 specifies a paper sheet type and a weight per square meter of a paper sheet to be used for image formation by operating, for example, the keyboard 1205 of the data processing device 12. Thereafter, image data is transmitted to the data processing device 12 from the PC 11 in accordance with further operations of the user. The data processing device 12 in the system 4 then performs the same processing as the data processing device 12 in the system 3 according to the third embodiment (or any modification of the third embodiment) except for a difference described below.

The difference between the data processings of the data processing devices 12 in the systems 4 and 3 is that, when specifying an error area for the second surface, the specifying unit 1306 uses a multiplying factor associated with a combination of a paper sheet type and a weight per square meter which are specified by a user. For example, there is a case that a user specifies "Kent paper" and "120 g/m$^2$" as search keys. In this case, the specifying unit 1306 searches the multiplying factor data set for an associated record by using "Kent paper" and "120 g/m$^2$" as search keys. From a record obtained as a search result, the specifying unit 1306 obtains a multiplying factor of 0.18. When specifying an error area for the second surface, the specifying unit 1306 moves positions of pixels forming an image expressed by a first surface read image data set respectively to diagonal positions. In addition, the specifying unit 1306 generates an approximate show-through image data set by multiplying densities of the pixels by the multiplying factor of 0.18 obtained by a search.

For example, there is supposed a case that the images shown in FIG. 7 are images each expressed by a second surface read image data set obtained by performing image formation on a Kent paper of 120 g/m$^2$. A stain image is supposed to have a density of 8. There is also supposed that a threshold which the specifying unit 1306 uses for specifying an error area is set to 5 so that even an image area having a density which is as low as the stain area is specified to be included in an error area.

In this case, the specifying unit 1306 in the system 3 according to the third embodiment uses a multiplying factor of 0.15. As a result, the letter "B" included in a comparative image data set has a density of 200, and a show-through density in this image is 30. The letter "B" included in an image expressed by a second surface read image data set to be compared with an image expressed by the comparative image data set has a density of 200. The show-through density in this image is 40, and the density of a stain image is 8 in this image.

The image expressed by the second surface read image data set is compared with the image expressed by the comparative image data set in a manner as described above. As a result, the specifying unit 1306 determines error areas to be the same as the images shown in FIG. 8. Therefore, the determination unit 1307 incorrectly determines both of the images shown in FIGS. 7A and 7B to be improperly formed images.

However, the specifying unit 1306 in the system 4 uses a multiplying factor which is determined depending on properties of a paper sheet. If the specifying unit 1306 uses a multiplying factor of 0.18 associated with properties of a paper sheet which are specified by a user, the letter "B" included in the image expressed by the comparative image data set has a density of 200, and the show-through density in this image is 36.

The image expressed by the second surface read image data set is compared with the image expressed by the comparative image data set in a manner as described above. As a result, the specifying unit 1306 determines error areas to be the same as the images shown in FIG. 9. Accordingly, the system 4 correctly determines that the image shown in FIG. 7A including a stain image is an improperly formed image while the image shown in FIG. 7B including no stain image is a properly formed image.

4-1. First Modification

The fourth embodiment as described above can be modified as follows. The following modification to the fourth embodiment will be referred to as a "first modification". In the first modification below, a user need not specify a paper sheet type or a weight per square meter but the data processing device 12 automatically specifies properties of a paper sheet and determines a multiplying factor to be used for forming an approximate show-through image data set.

In the first modification, the storage unit 1301 pre-stores a multiplying factor data set as shown in FIG. 18 in place of the multiplying factor data set shown in FIG. 17. The multiplying factor data set in FIG. 18 is constituted of data indicating multiplying factors which are respectively associated with representative show-through densities. In this figure, the representative show-through densities are show-through densities when an image having a density of 255 causes a show-through. However, the representative show-through densities are not limited to show-through densities with respect to an image having a density of 255. Show-through densities with respect to an image having any other density than 255 can be taken as the representative show-through densities.

A first surface read image data set, a second surface form image data set, and a second surface read image data set are obtained as image formation is performed normally. From the foregoing image data sets, the specifying unit 1306 specifies a representative show-through density to be the density of an image obtained by reading part where an image having a density of 255 is formed on the first surface while no image is formed on the second surface.

The specifying unit 1306 searches the multiplying factor data set for an associated record by using, as a search key, the representative show-through density specified as described above. From a multiplying factor obtained as a search result, the specifying unit 1306 obtains a multiplying factor. The specifying unit 1306 uses the multiplying factor obtained by the search when generating an approximate show-through image data set.

If an image having a density of 255 is not formed on the first surface, the specifying unit 1306 determines a representative show-through density for an image having a density of 255, from a show-through density of an image having a density other than 255, by using, for example, a predetermined calculation expression or a conversion data set. Otherwise, the specifying unit 1306 determines directly an associated multiplying factor from a show-through density of an image having a density of 255, by using, for example, a predetermined calculation expression or a conversion data set.

In the above description, a multiplying factor data set is searched for a multiplying factor by using, as a search key, a representative show-through density specified from a first surface read image data set, a second surface form image data set, and a second surface read image data set. However, the specifying unit 1306 can be alternatively configured so as to determine a multiplying factor from the specified representative show-through density by using a predetermined calculation expression, in place of searching for a multiplying factor as described above.

Also in the above description, a representative show-through density is specified from a first surface read image data set, a second surface form image data set, and a second surface read image data set, which are generated as image formation is performed normally. However, in place of specifying a representative show-through image from the foregoing image data sets, the specifying unit 1306 can be alternatively configured so as to perform image formation and image reading for determining a representative show-through density. Still alternatively, the specifying unit 1306 can be configured so that a light intensity indicated by a signal generated from a light receiver is used to specify a multiplying factor in place of using a representative show-through density. The light receiver is positioned facing a light emitter, sandwiching a feed path for paper sheets between the light receiver and the light emitter. Alternative configurations described above are available for the present modification as in the modification to the second embodiment as described previously. Still alternatively, the specifying unit 1306 can determine a multiplying factor from a light intensity indicated by a signal received from a light receiver, by using a predetermined calculation expression.

4-2. Second Modification

The fourth embodiment as described above can be differently modified as follows. The following modification to the fourth embodiment will be referred to as a "second modification". In the second modification below, the storage unit 1301 pre-stores a density conversion data set indicating show-through densities associated with densities of images on the first surface, in place of a multiplying factor data set. FIG. 19 shows an example of content of the density conversion data set. The density conversion data set includes plural records respectively associated with combinations each constituted of a paper sheet type and a weight per square meter. Each of the records indicates correspondences between densities of images on the first surface (hereinafter first surface densities) and show-through densities for the images having the first surface densities.

The density conversion data set is prepared as follows, for example, by a manufacturer of the data processing device 12. That is, images having densities of 0 to 255 are formed on first surfaces of various types of paper sheets having various weights per square meter. Thereafter, image data is generated by reading the formed images from the second surface side. Densities of images expressed by the image data are respectively associated with paper sheet types, weights per square meter, and first surface densities. The density conversion data set is prepared in this manner.

From the density conversion data set, the specifying unit 1306 extracts a data set associated with a paper sheet type and a weight per square meter which are specified by a user. In accordance with the extracted data set, the specifying unit 1306 converts a density (first surface density) of an image expressed by a first surface read image data set into a show-through density, thereby to generate an approximate show-through image data set. The approximate show-through image data set generated in this manner expresses an image having a density associated with properties of the paper sheet.

The second modification can be alternatively configured so as to use a density conversion data set shown in FIG. 20 in place of a density conversion data set shown in FIG. 19. The density conversion data set shown in FIG. 20 indicates relationships between first surface densities and show-through densities. The relationships are respectively associated with representative show-through densities which are show-through densities when an image having a density of 255 causes a show-through.

Also in a case of using the density conversion data set shown in FIG. 20, a first surface read image data set, a second surface form image data set, and a second surface read image data set are obtained as image formation is performed normally. From the foregoing image data sets, the specifying unit 1306 specifies, as a representative show-through density, the density of an image obtained by reading part where an image having a density of 255 is formed on the first surface while no image is formed on the second surface.

The specifying unit 1306 searches the density conversion data set for an associated data set by using, as a search key, the representative show-through density specified as described above. In accordance with the data set obtained as a search result, the specifying unit 1306 generates an approximate show-through image data set.

If an image having a density of 255 is not formed on the first surface, the specifying unit 1306 determines a representative show-through density for an image having a density of 255, from a show-through density of an image having a density other than 255, by using, for example, a predetermined calculation expression or a conversion data set. Otherwise, the specifying unit 1306 searches for a data set including a combination of a density of the image formed on the first surface and a density of an image which is obtained by reading a show-through image formed on the first surface, among plural data sets included in the density conversion data set. In accordance with the data set obtained as a search result, the specifying unit 1306 generates an approximate show-through image data set.

In the above description, a representative show-through density is specified from a first surface read image data set, a second surface form image data set, and a second surface read image data set, which are generated as image formation is performed normally. However, in place of specifying a representative show-through density from these image data sets, the specifying unit 1306 can be alternatively configured so as to perform image formation and image reading for determining a representative show-through density. Sill alternatively, the specifying unit 1306 can be configured so that a light intensity indicated by a signal generated from a light receiver is used to specify a multiplying factor in place of using a representative show-through density. The light receiver is positioned facing a light emitter, sandwiching a feed path for paper sheets between the light receiver and the light emitter. Such alternative configurations are also available for the present modification as in the modification to the second embodiment as described previously.

4-3. Third Modification

The fourth embodiment as described above can be still differently modified as follows. The following modification to the fourth embodiment will be referred to as a "third modification". In the third modification below, the storage unit 1301 does not stores the multiplying factor data set. Also in the third modification, the specifying unit 1306 does not search for a multiplying factor, depending on a paper sheet type and a weight per square meter which are specified by a user. Instead, the data processing device 12 in the third modification generates a density conversion data set.

A user instructs the data processing device 12 to generate a density conversion data set by operating the keyboard 1205 of the data processing device 12. Then, the data processing device 12 feeds a paper sheet having two surfaces on which images are not yet formed, from a sheet feed tray 121 or 122. The image forming unit 125 forms a pattern image whose density varies from 0 to 255 on a first surface of the paper sheet. Thereafter, a second surface read image data set is generated by reading the paper sheet from the second surface side by the image read unit 125. The data processing device 12 generates a density conversion data set by using a density indicated by the second surface read image data set which is read as described above, and stores the generated density conversion data set in the storage unit 1301.

FIG. 21 is a table showing an example of content of a density conversion data set which the data processing device 12 generates in the third modification. In the third modification, the density conversion data set generated by the data processing device 12 is the same as that shown in FIG. 19 according to the second modification, except for a difference as follows. That is, the density conversion data set generated by the data processing device 12 according to the third modification includes only one data set in place of plural data sets respectively associated with combinations of paper sheet types and weights per square meter.

When generating an approximate show-through image data set, the specifying unit 1306 converts a density (first surface density) of a mirror image of an image expressed by a first surface read image data set into a show-through density in accordance with the density conversion data set.

In the third modification, the specifying unit 1306 can be configured so as to generate and update a density conversion data set as image formation and image reading are performed normally, in addition to or in place of the configuration of generating a density conversion data set by using a pattern image as described above. In this case, from first and second surface read image data sets which are generated as image formation and image reading area performed normally, the specifying unit 1306 specifies a density of a show-through image when a density of part, in which an image is formed on the first surface but no image is formed on the second surface, is read from the second surface. The specifying unit 1306 updates the density conversion data set associated with a density of an image formed on the first surface, to data indicating the density of the show-through density which is specified as described above.

5. Other Modifications

The first to fourth embodiments described above can further be modified as follows.

In the above embodiments, functional configurations of components included in the PC 11 and the data processing device 12 can be arbitrarily changed. For example, a system according to the invention can be constructed as follows. That is, functions of the controller 120 are assigned to the PC 11. An image forming device which functions as the image forming unit 124 and an image read device (or image data generation device) which functions as the image reading unit 125 are connected to each other by a feed device having a sheet reversing function. These devices are each connected to the PC 11. In this manner, systems according to the invention can also be constructed.

Also in the above embodiments, the application executed by the controller 125 can be supplied in form of a CD-ROM or the like which contains the application or in form of a signal transmitted via a communication medium.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing device comprising:
   an obtaining unit that obtains a first image data set, a second image data set, and a property data set, the second image data set being generated by reading an image which is formed on a recording medium in accordance with the first image data set by an image forming device, and the property data set indicating a property of the recording medium; and
   a specifying unit that determines a threshold for a density difference between the first image data set and the second image data set, depending on the property data set, and specifies, as an error area, an area where the density difference between images expressed by the first and second image data sets is equal to or greater than the threshold.

2. A non-transitory computer readable medium storing a program causing a computer to execute a process comprising:
   obtaining a first image data set, a second image data set, and an property data set, the second image data set being generated by reading an image which is formed on a recording medium in accordance with the first image data set by an image forming device, and the property data set indicating a property of the recording medium; and
   a specifying unit that determines a threshold for a density difference between the first image data set and the second image data set, depending on the property data set, and specifies, as an error area, an area where the density difference between images expressed by the first and second image data sets is equal to or greater than the threshold.

3. A non-transitory computer readable medium storing a program causing a computer to execute a process comprising:
   obtaining a first image data set and a second image data set generated by reading an image which is formed on a surface of a recording medium in accordance with the first image data set by an image forming device; and
   specifying a first threshold for a density difference between the first image data set and the second image data set if no image is formed on another surface of the recording medium than the surface on which the image has been formed in accordance with the first image data set, and determines a second threshold for the density difference between the first image data set and the second image data set if an image is formed on the another surface, the second threshold being greater than the first threshold, and specifies, as an error area, an area where the density difference between images expressed by the first and second image data sets is equal to or greater than the first or second threshold.

4. A data processing device comprising:
   an obtaining unit that obtains a first image data set and a second image data set generated by reading an image which is formed on a surface of a recording medium in accordance with the first image data set by an image forming device; and
   a specifying unit that determines a first threshold for a density difference between the first image data set and the second image data set if no image is formed on another surface of the recording medium than the surface on which the image has been formed in accordance with the first image data set, and determines a second threshold for the density difference between the first image data set and the second image data set if an image is formed on the another surface, the second threshold being greater than the first threshold, and specifies, as an error area, an area where the density difference between images expressed by the first and second image data sets is equal to or greater than the first or second threshold.

5. The data processing device according to claim 4, wherein
the obtaining unit obtains a property data set indicating a property of the recording medium, and
the specifying unit determines the second threshold, depending on the property data set, if an image is formed on the another surface.

6. A data processing device comprising:
an obtaining unit that obtains first and second image data sets;
an image data generation unit that generates a third image data set by reading a second surface of a recording medium which has a first surface, on which an image has been formed in accordance with the first image data set by an image forming device, and the second surface on which an image has been formed in accordance with the second image data set by the image forming device; and
a specifying unit that corrects the second image data set on basis of the first image data set, and specifies, as an error area, an area where a density difference between images expressed by the corrected second image data set and the third image data set is equal to or greater than a predetermined threshold,
wherein the specifying unit obtains a property data set indicating a property of the recording medium, and determines the error area based on the property data set.

7. The data processing device according to claim 6, wherein the specifying unit corrects the second image data set by adding a density, which is obtained by correcting a density of a mirror image of an image expressed by the first image data set in accordance with a predetermined rule, to a density of an image expressed by the second image data set.

8. The data processing device according to claim 6, wherein
the image data generation unit generates the first image data set by reading the image formed on the first surface, and
the obtaining unit obtains the first image data set generated by the image data generation unit.

9. The data processing device according to claim 6, wherein the specifying unit obtains a property data set indicating a property of the recording medium, and determines the predetermined threshold, depending on the property data set.

10. The data processing device according to claim 6, wherein
the specifying unit specifies a show-through density for a case of reading an image formed with a predetermined density on the first surface of the recording medium, on basis of an image data set generated by reading a part of the recording medium from a side of the second surface, and on basis of an image data set expressing the image formed on the first surface, the part of the recording medium being where an image has been formed on the first surface and no image has been formed on the second surface, and
the specifying unit uses, as the property data set, a data set obtained from the show-through density.

11. The data processing device according to claim 6, wherein the first surface is a front surface of the recording medium and the second surface is a back surface of the recording medium.

12. The data processing device according to claim 9, further comprising a measurement unit that measures an intensity of light which is emitted from a light emitting element and penetrates through the recording medium, the light emitting element being positioned facing the measurement unit, sandwiching the recording medium between the light emitting element and the measurement unit, wherein
the specifying unit uses, as the property data set, a data set obtained from the intensity of light measured by the measurement unit.

13. A data processing device comprising:
an obtaining unit that obtains first and second image data sets;
an image data generation unit that generates a third image data set by reading a second surface of a recording medium which has a first surface, on which an image has been formed in accordance with the first image data set by an image forming device, and the second surface on which an image has been formed in accordance with the second image data set by the image forming device; and
a specifying unit that corrects the third image data set on basis of the first image data set, and specifies, as an error area, an area where a density difference between images expressed by the corrected third image data set and the second image data set is equal to or greater than a predetermined threshold,
wherein the specifying unit obtains a property data set indicating a property of the recording medium, and determines the error area based on the property data set.

14. The data processing device according to claim 13, wherein the specifying unit corrects the third image data set by subtracting a density, which is obtained by correcting a density of a mirror image of an image expressed by the first image data set in accordance with a predetermined rule, from a density of an image expressed by the third image data set.

15. The data processing device according to claim 13, wherein the first surface is a front surface of the recording medium and the second surface is a back surface of the recording medium.

16. A data processing device comprising:
an obtaining unit that obtains first and second image data sets;
an image data generation unit that generates a third image data set by reading a second surface of a recording medium which has a first surface, on which an image has been formed in accordance with the first image data set by an image forming device, and the second surface on which an image has been formed in accordance with the second image data set by the image forming device; and
a specifying unit that corrects the third image data set on basis of the second image data set, and specifies, as an error area, an area where a density difference between an image expressed by the corrected third image data set and an image having a density obtained by correcting a density of an image expressed by the first image data set in accordance with a predetermined rule is equal to or greater than a predetermined threshold,
wherein the specifying unit obtains a property data set indicating a property of the recording medium, and determines the error area based on the property data set.

17. The data processing device according to claim 16, wherein the specifying unit corrects the third image data set by subtracting a density of an image expressed by the second image data set from a density of an image expressed by the third image data set.

18. The data processing device according to claim 16 wherein the specifying unit obtains a property data set indicating a property of the recording medium, and determines the predetermined threshold, depending on the property data set.

19. The data processing device according to claim 16, wherein the first surface is a front surface of the recording medium and the second surface is a back surface of the recording medium.

* * * * *